(12) United States Patent
Nakagawa et al.

(10) Patent No.: US 8,500,063 B2
(45) Date of Patent: Aug. 6, 2013

(54) HYDRAULIC APPARATUS FOR AIRCRAFT ACTUATORS

(75) Inventors: Shingo Nakagawa, Gifu (JP); Atsushi Fukui, Gifu (JP)

(73) Assignee: Nabtesco Corporation (JP)

( * ) Notice: Subject to any disclaimer, the term of this patent is extended or adjusted under 35 U.S.C. 154(b) by 196 days.

(21) Appl. No.: 13/093,541

(22) Filed: Apr. 25, 2011

(65) Prior Publication Data

US 2011/0266390 A1 Nov. 3, 2011

(30) Foreign Application Priority Data

Apr. 28, 2010 (JP) ................................. 2010-103928

(51) Int. Cl.
*B64C 5/10* (2006.01)

(52) U.S. Cl.
USPC ........... 244/99.5; 244/99.4; 244/99.6; 60/405

(58) Field of Classification Search
USPC ................. 244/99.6, 99.5, 99.2, 213; 60/405, 60/592
See application file for complete search history.

(56) References Cited

U.S. PATENT DOCUMENTS

| | | | | | |
|---|---|---|---|---|---|
| 2,997,262 | A | * | 8/1961 | Kirk et al. | 244/123.12 |
| 3,347,495 | A | * | 10/1967 | Eberhardt et al. | 244/207 |
| 3,756,637 | A | * | 9/1973 | Wildi | 439/819 |
| 5,526,999 | A | * | 6/1996 | Meston | 244/2 |
| 5,705,865 | A | * | 1/1998 | Ishida et al. | 310/62 |
| 6,612,522 | B1 | * | 9/2003 | Aldrin et al. | 244/2 |
| 7,600,715 | B2 | * | 10/2009 | Matsui | 244/99.6 |
| 7,870,726 | B2 | * | 1/2011 | Matsui | 60/405 |
| 8,191,824 | B2 | * | 6/2012 | Shaheen et al. | 244/76 A |
| 2005/0129531 | A1 | * | 6/2005 | Fenny et al. | 417/269 |
| 2006/0226285 | A1 | * | 10/2006 | Matsui | 244/99.6 |
| 2007/0114305 | A1 | * | 5/2007 | Yamaguchi et al. | 239/690 |
| 2009/0266934 | A1 | * | 10/2009 | Makino | 244/99.5 |
| 2009/0272110 | A1 | * | 11/2009 | Matsui | 60/451 |
| 2009/0308983 | A1 | * | 12/2009 | Jones | 244/227 |
| 2011/0062166 | A1 | * | 3/2011 | Ingersoll et al. | 220/581 |
| 2011/0258996 | A1 | * | 10/2011 | Ingersoll et al. | 60/421 |
| 2012/0001021 | A1 | * | 1/2012 | Fukui | 244/99.6 |
| 2012/0029859 | A1 | * | 2/2012 | Fukui et al. | 702/114 |
| 2012/0045613 | A1 | * | 2/2012 | Sanderson | 428/137 |
| 2012/0085860 | A1 | * | 4/2012 | Nakagawa et al. | 244/99.4 |
| 2012/0131912 | A1 | * | 5/2012 | Fukui et al. | 60/405 |

FOREIGN PATENT DOCUMENTS

JP 2007-046790 A 2/2007

* cited by examiner

*Primary Examiner* — Timothy D Collins
*Assistant Examiner* — Medhat Badawi
(74) *Attorney, Agent, or Firm* — Studebaker & Brackett PC (57) ABSTRACT

A pump unit installed inside a wing, and a panel body constituting part of a wing structure portion forming a surface structure of the wing are provided. The pump unit includes a backup hydraulic pump that can supply pressure oil to an actuator when a loss or reduction occurs in the function of an aircraft central hydraulic power source and an electric motor that drives this pump. Except for at least the panel body, the wing structure portion is formed from fiber reinforced plastics. The panel body is formed of a metallic material.

9 Claims, 9 Drawing Sheets

HYDRAULIC APPARATUS FOR AIRCRAFT ACTUATORS

CROSS-REFERENCE TO RELATED APPLICATIONS

This application claims priority to Japanese Patent Application No. 2010-103928. The entire disclosure of Japanese Patent Application No. 2010-103928 is hereby incorporated herein by reference.

BACKGROUND OF THE INVENTION

1. Field of the Invention

The present invention relates to a hydraulic apparatus for aircraft actuators that supplies pressure oil to a hydraulically-operated actuator for driving a control surface of an aircraft.

2. Description of Related Art

An aircraft is provided with control surfaces that are formed as moving surfaces (flight control surfaces) and are configured as an aileron, an elevator, and the like. A hydraulically-operated actuator is often used as an actuator for driving such control surfaces. Further, pressure oil is supplied to such an actuator from an aircraft central hydraulic power source. However, a loss or reduction in the function (pressure oil supply function) of the aircraft central hydraulic power source may occur. To address this problem, JP 2007-46790A discloses a hydraulic apparatus (hydraulic apparatus for aircraft actuators) that can supply pressure oil to an actuator even if a loss or reduction in the function of the aircraft central hydraulic power source occurs.

The hydraulic apparatus for aircraft actuators that is disclosed in JP 2007-46790A includes a pump and an electric motor that are provided independently of the aircraft central hydraulic power source. The pump is provided so as to raise the pressure of pressure oil that is discharged from the actuator and to supply the pressure oil to the actuator. The electric motor is configured to drive the pump when the aircraft central hydraulic power source undergoes a pressure decrease and a loss or reduction in its function occurs.

SUMMARY OF THE INVENTION

Even if a loss or reduction in the function of the aircraft central hydraulic power source occurs, the actuator can be driven by operating a hydraulic apparatus for aircraft actuators as disclosed in JP 2007-46790A. However, in the case of a loss or reduction in f the function of the aircraft central hydraulic power source, the above-described hydraulic apparatus is continuously running. This tends to cause an increase in the temperature of the pump and the electric motor of the hydraulic apparatus, and also tends to cause an increase in the temperature of the oil (working fluid) that is supplied as the pressure oil from the hydraulic apparatus to the actuator and that is circulated between the hydraulic apparatus and the actuator. Accordingly, there is a significant constraint on the continuous running time and the time for oil replacement associated with oil degradation.

Furthermore, a further reduction in the weight of aircrafts is required in recent years, and therefore there is a trend toward more frequent use of fiber reinforced plastics, which is a composite material, as the material for forming aircraft wings. Size reduction and weight reduction are also desired for the above-described hydraulic apparatus. For this reason, it is desired that the hydraulic apparatus is installed in an area closer to the actuator inside the wings. In this case, as the temperatures of the hydraulic apparatus and the oil used increase, the temperature of the air inside the wings, which are made of fiber reinforced plastics, also tends to increase, which may further accelerate the increase in temperature of the hydraulic apparatus and the oil. In other words, the fiber reinforced plastics used as the material of the wings facilitate an increase in the temperature inside the wings. Although the heat generated in the hydraulic apparatus can be easily released to the outside of the wings when aluminum, which is excellent in thermal conduction, is used as the material of the wings as in conventional aircraft, it is difficult to expect a sufficient heat release effect to be achieved with the wings made of fiber reinforced plastics, which have low thermal conductivity.

In view of the foregoing circumstances, it is an object of the present invention to provide a hydraulic apparatus for aircraft actuators that can drive the actuator even in the case of a loss or reduction in the function of the aircraft central hydraulic power source, can realize a reduction in size and weight of the configuration of the apparatus, and can suppress an increase in the temperature of the apparatus and the oil used.

According to a first feature of a hydraulic apparatus for aircraft actuators according to the present invention for achieving the above-described object, there is provided a hydraulic apparatus for aircraft actuators that supplies pressure oil to a hydraulically-operated actuator for driving a control surface of an aircraft, the apparatus including: a pump unit installed inside a wing of the aircraft; and a panel body constituting part of a wing structure portion forming a surface structure of the wing, wherein the pump unit includes a backup hydraulic pump that can supply pressure oil to the actuator when a loss or reduction occurs in a function of an aircraft central hydraulic power source and an electric motor that drives the backup hydraulic pump, except for at least the panel body, the wing structure portion is formed from fiber reinforced plastics, and the panel body is formed of a metallic material.

With this configuration, even if a loss or reduction in the function of the aircraft central hydraulic power sources occur, the actuator can be driven by the pressure oil being supplied from the backup hydraulic pump of the pump unit installed inside the wing. Also, since the pump unit is installed inside the wing whose weight has been reduced due to the principal part of the wing structure portion being made from fiber reinforced plastics, a reduction in size and weight of the hydraulic apparatus for aircraft actuators (hereinafter, also simply referred to as a "hydraulic apparatus") as well can be realized. Furthermore, with a hydraulic apparatus having this configuration, the panel body constituting part of the wing structure portion, which is a surface structure of the wing, is formed of a metallic material having high thermal conductivity. Accordingly, the heat generated from the backup hydraulic pump and the electric motor of the hydraulic apparatus can be removed from the panel body via the air inside the wing or via heat conduction to cool the hydraulic apparatus, and also can be directly released into the atmosphere outside the wing. Furthermore, this also makes it possible to utilize the cooling function of the oil used in the hydraulic apparatus, thus suppressing an increase in the oil temperature.

Accordingly, it is possible, with this configuration, to provide a hydraulic apparatus for aircraft actuators that can drive the actuator even in the case of a loss or reduction in the function of the aircraft central hydraulic power source, can realize a reduction in size and weight of the configuration of the apparatus, and can suppress an increase in the temperature of the apparatus and the oil used.

According to a second feature of a hydraulic apparatus for aircraft actuators according to the present invention, the hydraulic apparatus for aircraft actuators having the first feature further includes a plurality of fins that are implemented on the panel body and that are formed of a metallic material in the shape of a protrusion or a protruding plate, wherein the plurality of fins are implemented so as to be able to conduct heat to and from the panel body.

With this configuration, the plurality of fins that are formed of a metallic material in the shape of a protrusion or a protruding plate are implemented so as to be able to conduct heat to and from the panel body. Accordingly, the heat generated in the hydraulic apparatus can be removed via the air inside the wing or can be released to the atmosphere outside the wing even more efficiently, via the metal fins for which a large surface area is ensured.

According to a third feature of a hydraulic apparatus for aircraft actuators according to the present invention, in the hydraulic apparatus for aircraft actuators having the second feature, a plurality of first fins that are implemented so as to protrude toward the inside of the wing are provided as the plurality of fins.

With this configuration, the first fins that are implemented so as to protrude toward the inside of the wing are provided as the fins implemented on the panel body, and therefore the heat generated in the hydraulic apparatus can be even more efficiently removed via the air inside the wing, via these fins.

According to a fourth feature of a hydraulic apparatus for aircraft actuators according to the present invention, in the hydraulic apparatus for aircraft actuators having the second feature, a plurality of second fins that are implemented so as to protrude toward the outside of the wing are provided as the plurality of fins.

With this configuration, the second fins that are implemented so as to protrude toward the outside of the wing are provided as the fin implemented on the panel body, and therefore the heat that has generated in the hydraulic apparatus and has been removed via the air inside the wing or via heat conduction can be even more efficiently released into the atmosphere outside the wing, via these fins.

According to a fifth feature of a hydraulic apparatus for aircraft actuators according to the present invention, in the hydraulic apparatus for aircraft actuators having the fourth feature, the plurality of fins are provided as fairings that regulate a flow of air on the surface of the wing.

With this configuration, the plurality of fins for releasing heat into the atmosphere outside the wing can also be used to serve the function as fairings. Moreover, it is possible to realize the weight reduction as compared to the case where fairings are separately provided. Accordingly, the fins can be provided with multiple functions, thus also making it possible to realize the weight reduction efficiently.

According to a sixth feature of a hydraulic apparatus for aircraft actuators according to the present invention, in the hydraulic apparatus for aircraft actuators having the first feature, the pump unit is integrally joined to the panel body.

With this configuration, since the pump unit is integrally joined to the panel body, heat can be conducted from the pump unit directly to the panel body. Accordingly, the heat generated in the hydraulic apparatus can be removed to the panel body and released into the atmosphere outside the wing.

According to a seventh feature of a hydraulic apparatus for aircraft actuators according to the present invention, in the hydraulic apparatus for aircraft actuators having the first feature, the panel body is provided as an access hatch that can be opened for maintenance of interior of the wing.

With this configuration, the panel body for removing the heat inside the wing and releasing it into the atmosphere outside the wing can also be used to serve the function as an access hatch. Moreover, it is possible to simplify the production process since there is no need to separately form an aperture hole in the wing structure portion for providing an access hatch. In other words, the panel body can be provided with multiple functions, thus also simplifying the production process of the owing structure portion.

According to an eighth feature of a hydraulic apparatus for aircraft actuators according to the present invention, in the hydraulic apparatus for aircraft actuators having the first feature, the pump unit includes a planar pump base serving as a base portion on which the backup hydraulic pump is installed, and the pump base is formed of a metallic material and is implemented so as to be able to conduct heat to and from the panel body.

With this configuration, the pump base is implemented so as to be able to conduct heat to and from the panel body, and therefore the heat generated in the hydraulic apparatus can be efficiently conducted to the panel body via the pump base. Accordingly, the heat generated in the hydraulic apparatus can be removed to the panel body and released into the atmosphere outside the wing.

According to a ninth feature of a hydraulic apparatus for aircraft actuators according to the present invention, in the hydraulic apparatus for aircraft actuators having the eighth feature, the panel body is coupled to the pump base via a metal hinge portion.

With this configuration, the panel body is coupled to the metal pump base via the metal hinge portion. Accordingly, it is possible to easily realize a configuration that couples the panel body to the pump base such that heat can be conducted therebetween.

According to a tenth feature of a hydraulic apparatus for aircraft actuators according to the present invention, in the hydraulic apparatus for aircraft actuators having the first feature, the pump unit includes a cooling fan that cools the electric motor, and a driver that is disposed downstream of the cooling fan and that drives the electric motor.

With this configuration, the driver for driving the electric motor is disposed downstream of the cooling fan for cooling the electric motor, and therefore the driver can be efficiently cooled by the cooling fan inside the wing. Also, the heat removed from the driver is removed from the panel body via the air inside the wing, and is then released into the atmosphere outside the wing. Accordingly, the driver for driving the electric motor can also be efficiently cooled.

It should be appreciated that the above and other objects, and features and advantages of the present invention will become apparent from the following description taken in conjunction with the accompanying drawings.

DETAILED DESCRIPTION OF THE INVENTION

Hereinafter, embodiments for carrying out the present invention will be described with reference to the accompanying drawings. It should be appreciated that embodiments of the present invention can be widely applied as a hydraulic apparatus for aircraft actuators that supplies pressure oil to a hydraulically-operated actuator for driving an aircraft control surface.

First Embodiment

Figure 1:
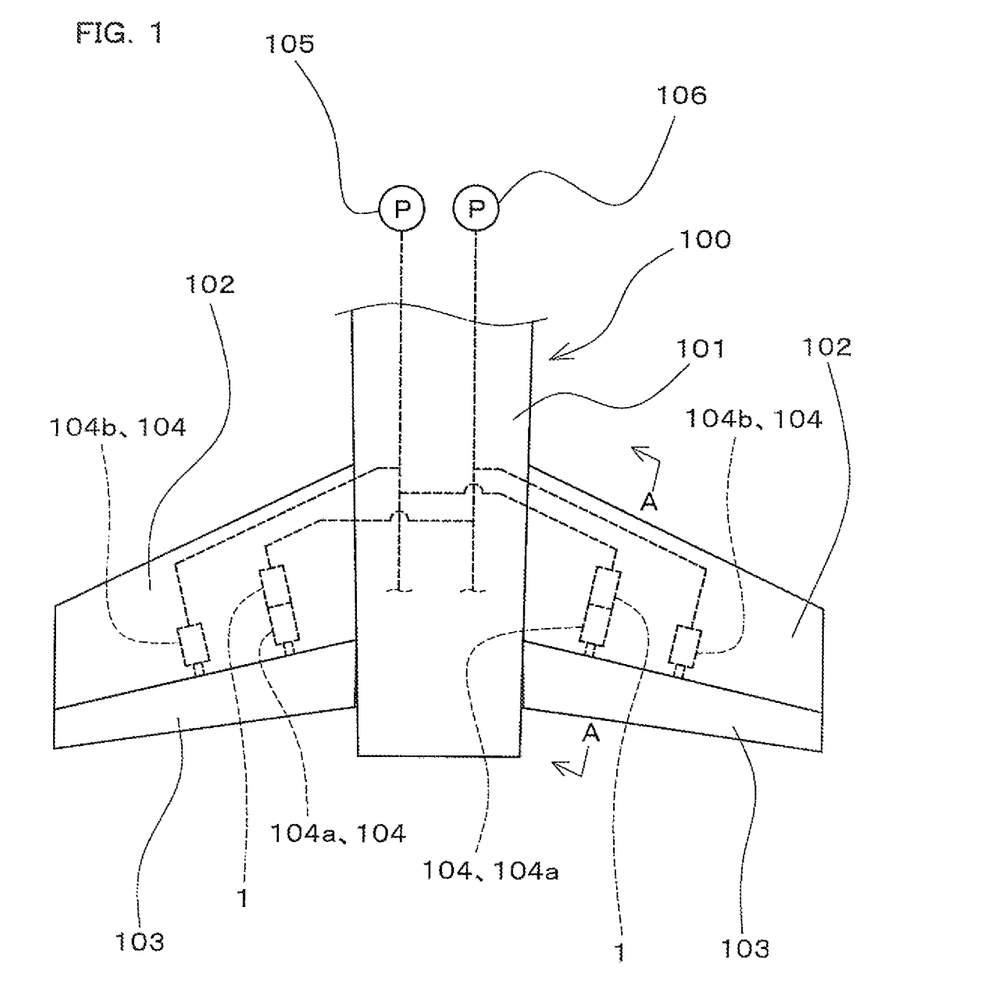
FIG. 1 is a diagram schematically showing part of an aircraft to which a hydraulic apparatus for aircraft actuators according to a first embodiment of the present invention is applied.

FIG. 1 is a diagram schematically showing part of an aircraft 100 to which a hydraulic apparatus 1 for aircraft actuators (hereinafter, also simply referred to as a "hydraulic apparatus 1") according to a first embodiment of the present invention is applied, showing a rear part of a body 101 of the aircraft 100 and a pair of tailplanes (102, 102). In FIG. 1, illustration of a vertical tail at the rear part of the body 101 is omitted.

Each of the two tailplanes (102, 102) is provided with an elevator 103 as a moving surface (flight control surface) constituting a control surface of the aircraft 100. The elevator 103 of each tailplane 102 is configured to be driven by a plurality of (for example, two) actuators 104 (104a, 104b), as illustrated in FIG. 1. Actuators (104a, 104b) for driving elevators 103 and a hydraulic apparatus 1 configured to supply pressure oil to one of the actuators, namely the actuator 104a, are installed inside each tailplane 102.

Note that the actuators (104a, 104b) and the hydraulic apparatus 1 that are respectively installed in the pair of tailplanes (102, 102) are configured in the same manner. Therefore, in the following description, the actuators (104a, 104b) and the hydraulic apparatus 1 that are installed in one of the tailplanes 102 will be described. The description of the actuators (104a, 104b) and the hydraulic apparatus 1 installed in the other tailplane is omitted.

Figure 2:
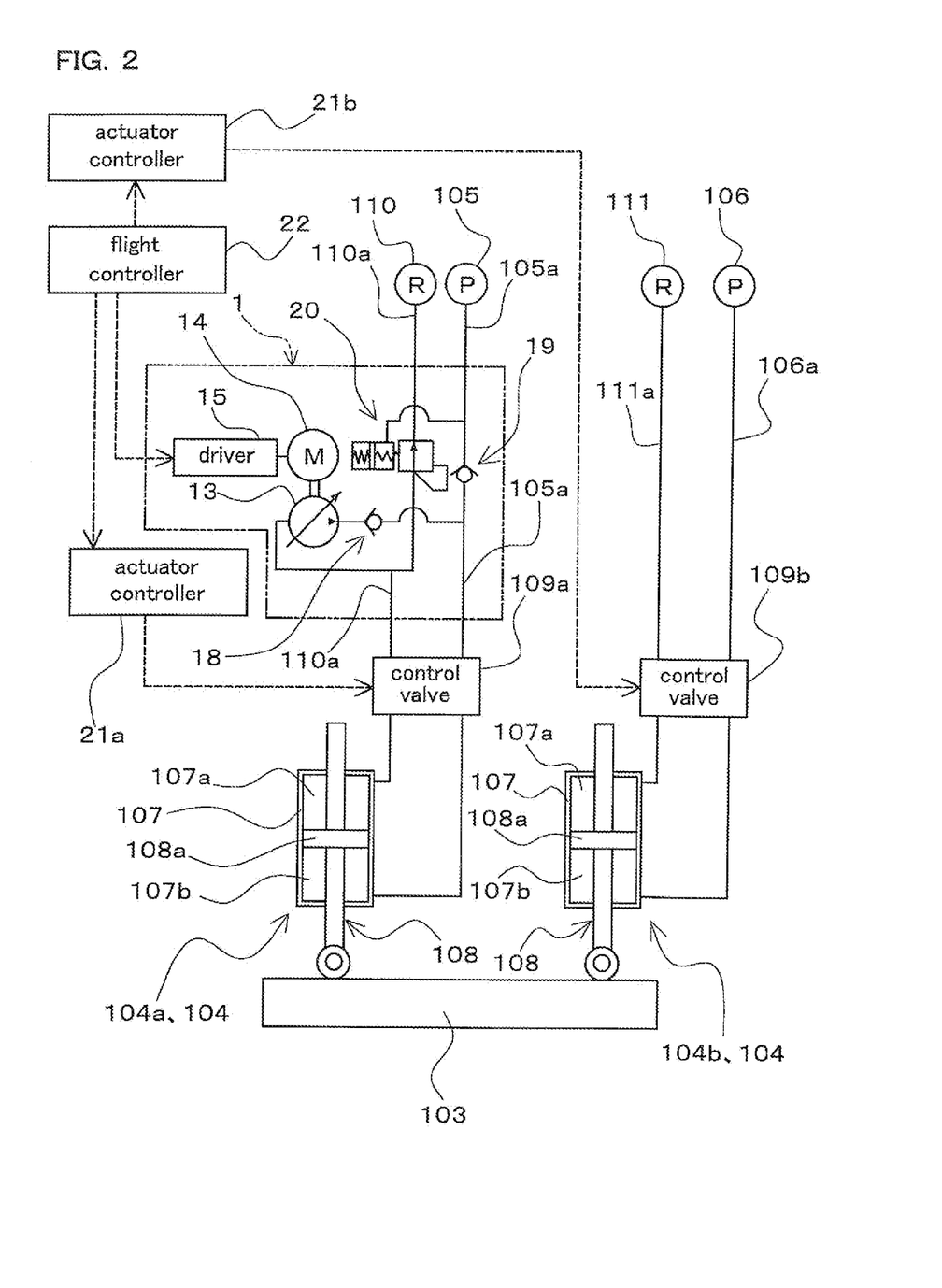
FIG. 2 is a diagram schematically showing the hydraulic apparatus for aircraft actuators shown in FIG. 1 together with a control surface and actuators.

FIG. 2 is a hydraulic circuit diagram schematically showing a hydraulic circuit including the actuators (104a, 104b) for driving an elevator 103 provided in one of the tailplanes 102 and a hydraulic apparatus 1 configured to supply pressure oil to one of the actuators, namely the actuator 104a. Each of the actuators (104a, 104b) includes, for example, a cylinder 107 and a rod 108 provided with a piston 108a, with the interior of the cylinder 107 divided into two oil chambers (107a, 107b) by the piston 108a. Also, each of the oil chambers (107a, 107b) in the cylinder 107 of the actuator 104a is configured to be in communication with a first aircraft central hydraulic power source 105 and a reservoir circuit 110 via a control valve 109a. On the other hand, each of the oil chambers (107a, 107b) in the cylinder 107 of the actuator 104b is configured to be in communication with a second aircraft central hydraulic power source 106 and a reservoir circuit 111 via a control valve 109b.

The first aircraft central hydraulic power source 105 and the second aircraft central hydraulic power source 106 each include a hydraulic pump that supplies pressure oil, and are installed on the body 101 side (inside the body 101) as systems that are independent of each other. Also, the first and second aircraft central hydraulic power sources (105, 106) are each provided as an aircraft central hydraulic power source, which is a hydraulic power source that supplies pressure oil to the actuators 104 of the elevator 103 and actuators (not shown) for driving control surfaces other than the elevator 103. Further, the first aircraft central hydraulic power source 105 is connected with the actuators 104 so as to be able to supply pressure oil to the actuator 104a installed in one of the tailplanes 102 and the actuator 104b installed in the other tailplane 102. On the other hand, the second aircraft central hydraulic power source 106 is connected with the actuators 104 so as to be able to supply pressure oil to the actuator 104b installed in one of the tailplanes 102 and the actuator 104a installed in the other tailplane 102.

The reservoir circuit 110 includes a tank (not shown) into which oil (working fluid) that is supplied as pressure oil and is thereafter discharged from the actuators 104 flows back, and the reservoir circuit 110 is configured to be in communication with the first aircraft central hydraulic power source 105. The reservoir circuit 111 that is configured as a system independent of the reservoir circuit 110 includes a tank (not shown) into which oil (working fluid) that is supplied as pressure oil and is thereafter discharged from the actuators 104 flows back, and the reservoir circuit 111 is configured to be in communication with the second aircraft central hydraulic power source 106 that is configured as a system independent of the first aircraft central hydraulic power source 105. Note that the reservoir circuit 110 is connected with the actuator 104a installed in one of the tailplanes 102 and the actuator 104b installed in the other tailplane 102, and is also connected with the first aircraft central hydraulic power source 105. Consequently, the pressure of the oil that has returned to the reservoir circuit 110 is raised by the first aircraft central hydraulic power source 105, and the oil is supplied to predetermined actuators 104. On the other hand, the reservoir circuit 111 is connected with the actuator 104b installed in one of the tailplanes 102 and the actuator 104a installed in the other tailplane 102, and is also connected with the second aircraft central hydraulic power source 106. Consequently, the pressure of the oil that has returned to the reservoir circuit 111 is raised by the second aircraft central hydraulic power source 106, and the oil is supplied to predetermined actuators 104.

The control valve 109a is provided as a valve mechanism that switches the state of connection of the oil chambers (107a, 107b) with a supply passage 105a in communication with the first aircraft central hydraulic power source 105 and an exhaust passage 110a in communication with the reservoir circuit 110. The control valve 109b is provided as a valve mechanism that switches the state of connection of the oil chambers (107a, 107b) with a supply passage 106a in communication with the second aircraft central hydraulic power source 106 and an exhaust passage 111a in communication with the reservoir circuit 111. The control valve 109a may be configured, for example, as an electromagnetic switching valve, and may be driven in accordance with a command signal from an actuator controller 21a that controls operation of the actuator 104a. The control valve 109b may be configured, for example, as an electromagnetic switching valve, and may be driven in accordance with a command signal from an actuator controller 21b that controls operation of the actuator 104b.

Note that actuator controller 21a controls the actuator 104a in accordance with a command signal from a flight controller 22 serving as a superordinate computer that commands operation of the elevator 103. The actuator controller 21b controls the actuator 104b in accordance with a command signal from the flight controller 22. The actuator controller 21a and the actuator controller 21b may be installed, for example, as controllers of a centralized control system, or controllers of a distributed processing system. In the case of the centralized control system, the actuator controller 21a and the actuator controller 21b are installed in a single casing (not shown) installed on the body 101 side, and the system is configured such that the actuator controller 21a controls the actuator 104a and the actuator controller 21b controls the actuator 104b. In the case of the distributed processing system, the actuator controller 21a is installed in a casing (not shown) mounted to the actuator 104a and the actuator controller 21b is installed in a casing (not shown) mounted to the actuator 104b, and the system is configured such that the actuator controller 21a controls the actuator 104a and the actuator controller 21b controls the actuator 104b. Although this embodiment has been described taking, as an example, a configuration in which command signals from a single flight controller 22 are input into a plurality of different actuator controllers (21a, 21b), this need not be the case. For example, it is possible to adopt a configuration in which a plurality of command signals from different flight controllers are respectively input into different actuator controllers (21a, 21b).

Further, the above-described control valve 109a is switched in accordance with a command from the actuator controller 21a, and thereby pressure oil is supplied from the supply passage 105a to one of the oil chambers (107a, 107b) and the oil is discharged from the other of the oil chambers (107a, 107b) to the exhaust passage 110a. Consequently, the rod 108 is displaced relative to the cylinder 107, thus driving the elevator 103. Although not shown, a mode switching valve that switches the state (mode) of communication between the oil chambers (107a, 107b) is provided between the control valve 109a and the actuator 104a. Note that the control valve 109b is configured in the same manner as the control valve 109a described above, and therefore the description thereof is omitted.

Next, the hydraulic apparatus 1 according to this embodiment will be described in detail. The hydraulic apparatus 1 shown in FIGS. 1 and 2 is configured to supply pressure oil to the hydraulically-operated actuator 104a for driving the elevator 103. Although this embodiment has been described, taking, as an example, a case where the hydraulic apparatus 1 supplies pressure oil to the actuator 104a for driving a control surface configured as the elevator 103, this need not be the case. That is, the hydraulic apparatus 1 may be used as a hydraulic apparatus that supplies pressure oil to an actuator for driving a control surface other than an elevator, such an aileron.

Figure 3:
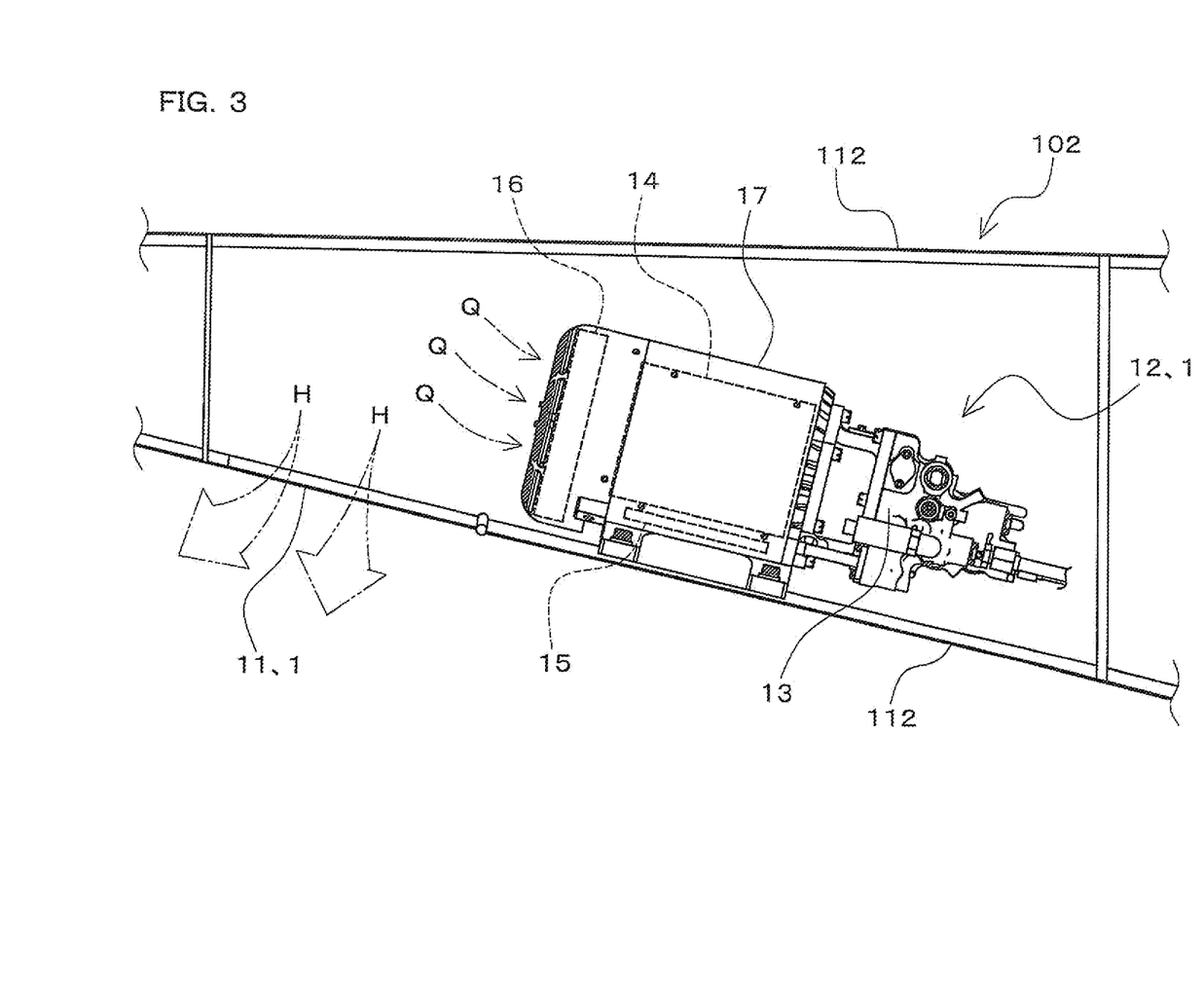
FIG. 3 is a diagram showing the hydraulic apparatus for aircraft actuators shown in FIG. 1 together with part of a wing, as viewed from the position of the arrows A-A.

FIG. 3 is a diagram showing the hydraulic apparatus 1 together with part of the tailplane 102, as viewed from the position of the arrows A-A in FIG. 1. The hydraulic apparatus 1 shown in FIGS. 1 to 3 includes a panel body 11 and a pump unit 12. Note that in FIG. 3, part of the tailplane 102 is shown in perspective as a diagram including a cross section as viewed from the side of the pump unit 12. In addition, illustration of the elements other than the tailplane 102 and the hydraulic apparatus 1 are omitted in FIG. 3.

In this embodiment, the pump unit 12 is installed inside the tailplane 102 serving as a wing of the aircraft 100, as shown in FIG. 3. Further, the panel body 11 is formed as a planar member, and constitutes part of a wing structure portion 112 forming the surface structure of the tailplane 102. Also, the panel body 11 is provided as an access hatch that can be opened to inspect the interior of the tailplane 102, and is openably coupled to the wing structure portion 112 via a hinge portion. Note that this embodiment illustrates a configuration in which the panel body 11 is disposed on the undersurface side of the tailplane 102.

The panel body 11 and the above-mentioned hinge portion of the wing structure portion 112 are formed of a metallic material, and the panel body 11 is formed of, for example, an aluminum alloy. Except of at least the panel body 11 and the hinge portion, the wing structure portion 112 is formed from carbon fiber reinforced plastics as a composite material. For example, the portions of the wing structure portion 112 other than the panel body 11 and the hinge portion may be formed from carbon fiber reinforced plastics.

Note that the portions of the wing structure portion 112 other than the panel body 11 and the hinge portion may contain a material other than carbon fiber reinforced plastics. Further, the portions of the wing structure portion 112 other than the panel body 11 and the hinge portion may be formed from fiber reinforced plastics other than carbon fiber reinforced plastics, including, for example, glass fiber reinforced plastics, glass mat reinforced plastics, boron fiber reinforced plastics, aramid fiber reinforced plastics, polyethylene fiber reinforced plastics, or Zylon fiber reinforced plastics.

The pump unit 12 shown in FIGS. 2 and 3 includes a backup hydraulic pump 13, an electric motor 14, a driver 15, a cooling fan 16, a housing 17, and so forth, and is installed inside the tailplane 102. In the pump unit 12, the electric motor 14, the driver 15, and the cooling fan 16, which are indicated by the dashed lines in FIG. 3, are housed inside the housing 17 made of metal (for example, steel), and the backup hydraulic pump 13 is fixed to the housing 17. The housing 17 is fixed to the wing structure portion 112. Note that the driver 15 need not be incorporated in the housing 17, and may be configured separately and installed outside the housing 17.

The backup hydraulic pump 13 may be configured, for example, as a variable capacity-type hydraulic pump. The suction side of the backup hydraulic pump 13 is connected in communication with the exhaust passage 110a, and its discharge side is connected in communication with the supply passage 105a via a check valve 18 so as to be able to supply pressure oil to the supply passage 105a. Further, the backup hydraulic pump 13 is provided as a hydraulic pump that can supply pressure oil to the actuator 104a at the occurrence of a loss or reduction in the function (pressure oil supply function) of the first aircraft central hydraulic power source 105 due to a failure of the hydraulic pump, oil leakage, and the like in the first aircraft central hydraulic power source 105.

A check valve 19 that permits flow of pressure oil into the actuator 104a and regulates flow of the oil in the opposite direction is provided upstream (on the first aircraft central hydraulic power source 105 side) of a location of the supply passage 105a where the discharge side of the backup hydraulic pump 13 is connected. Further, a relief valve 20 that discharges pressure oil into the reservoir circuit 110 when the pressure of the oil discharged from the actuator 104a rises is provided downstream (on the reservoir circuit 110 side) of a location of the exhaust passage 110a where the suction side of the backup hydraulic pump 13 is connected. Also, the relief valve 20 is provided with a pilot pressure chamber that is in communication with the supply passage 105a and in which a spring is disposed. When the pressure of the pressure oil supplied from the supply passage 105a decreases below a predetermined pressure value, the pressure of the pressure oil being supplied as a pilot pressure oil to the pilot pressure chamber (pilot pressure) from the supply passage 105a also decreases below a predetermined pressure value, as a result of which the exhaust passage 110a is blocked by the relief valve 20. In the case of a loss or reduction in the function of the first aircraft central hydraulic power source 105, the provision of the above-described check valves (18, 19) and the relief valve 20 allows the pressure of the oil discharged from the actuator 104a to be raised by the backup hydraulic pump 13 without the oil returning to the reservoir circuit 110, and the pressure oil with an increased pressure is supplied to the actuator 104a.

The electric motor 14 is coupled to the backup hydraulic pump 13 via a coupling (not shown), and is configured to drive the backup hydraulic pump 13. Note that the operational status of the electric motor 14 is controlled via the driver 15 in accordance with a command signal from the flight controller 22 serving as a superordinate computer that commands operation of the elevator 103.

The flight controller 22 is connected to a pressure sensor (not shown) that detects the discharge pressure of the first aircraft central hydraulic power source 105 or the pressure of pressure oil passing through the supply passage 105a such that a pressure detecting signal detected by the pressure sensor is input into the flight controller 22. Also, the flight controller 22 is configured to detect a loss or reduction in the function of the first aircraft central hydraulic power source 105 in accordance with the above-described pressure detecting signal.

For example, the flight controller 22 may be configured to detect a reduction of the function of the first aircraft central hydraulic power source 105 according to the timing with which the pressure value of the pressure detecting signal becomes equal to or less than a predetermined first pressure value, and detect a loss of the function of the first aircraft central hydraulic power source 105 according to the timing with which the pressure value of the pressure detecting signal becomes equal to or less than a predetermined second pressure value that is smaller than the first pressure value. Alternatively, the flight controller 22 may be configured to detect a loss or reduction in the function of the first aircraft central hydraulic power source 105 according to the timing with which the pressure value of the pressure detecting signal becomes equal to or less than a predetermined pressure value. When a loss or reduction in the function of the first aircraft central hydraulic power source 105 is detected by the flight controller 22, the electric motor 14 is started to operate in accordance with a command signal from the flight controller 22, as a result of which pressure oil is supplied to the actuator 104a as described above. Furthermore, the electric motor 14 may be started in accordance with a signal from flight controller 22, for example, in a stage when the aircraft is placed in a landing attitude, regardless of the pressure detecting signal. This can ensure a safe flight even if a sudden loss or reduction of the function of the first aircraft central hydraulic power source 105 occurs in the landing stage, since the electric motor 14 is already in operation.

The driver 15 is provided as a circuit board or the like that drives the electric motor 14 by controlling the electric power supplied to the electric motor 14 and the running speed (rotation speed) of the electric motor 14 in accordance with a command signal from the flight controller 22. The cooling fan 16 is provided as a fan that cools the electric motor 14, and is configured as an axial fan, a sirocco fan, or the like.

For example, the cooling fan 16 may be installed so as to be coupled to the rotating shaft of the electric motor 14 on the side opposite to the backup hydraulic pump 13 side, and may be configured to be rotationally driven by the rotational driving force of the electric motor 14. Also, many slit-like openings for taking in the air are formed in an end of the housing 17 in a portion that the cooling fan 16 faces. As indicated by the arrows Q shown as arrows of alternate long and short dash lines in FIG. 3, the cooling fan 16 is configured to take in the air from an opening at an end of the housing 17 and to generate a cooling air flow flowing through the interior of the housing 17 toward the backup hydraulic pump 13. Accordingly, the driver 15, the electric motor 14, and the backup hydraulic pump 13, which are disposed downstream of the cooling fan 16 (i.e., downstream of the cooling air flow generated by the cooling fan 16) are cooled by the cooling air generated by the cooling fan 16.

Next, an operation of the hydraulic apparatus 1 will be described. Note that the operation of the hydraulic apparatus 1 will be described only for the hydraulic apparatus 1 connected with the first aircraft central hydraulic power source 105 and the operation of the hydraulic apparatus 1 connected with the second aircraft central hydraulic power source 106 are the same as this and thus is omitted, as with the description of the above configuration of the hydraulic apparatus 1.

In a state where a loss or reduction in the function of the first aircraft central hydraulic power source 105 has not occurred, the backup hydraulic pump 13 is not operated. In this state, the pressure oil from the first aircraft central hydraulic power source 105 is supplied to one of the oil chambers (107a, 107b) of the actuator 104a via the control valve 109a. The oil is discharged from the other of the oil chambers (107a, 107b) and is returned to the reservoir circuit 110 via the control valve 109a. Further, switching between the oil chambers (107a, 107b) to which pressure oil is supplied and from which the oil is discharged is performed by switching the state of connection of the control valve 109a in accordance with a command signal from the actuator controller 21a, as a result of which the actuator 104a is operated to drive the elevator 103.

On the other hand, when a loss or reduction in the function of the first aircraft central hydraulic power source 105 occurs, the electric motor 14 is started to operate in accordance with a command signal from the flight controller 22, thus starting the backup hydraulic pump 13 to operate. Then, the pressure oil from the backup hydraulic pump 13 is supplied to one of the oil chambers (107a, 107b) of the actuator 104a via the control valve 109a. The oil is discharged from the other of the oil chambers (107a, 107b) and is then sucked in by the backup hydraulic pump 13 via the control valve 109a, and thus the pressure of the oil is raised. Further, switching between the oil chambers (107a, 107b) to which pressure oil is supplied and from which the oil is discharged is performed by switching the state of connection of the control valve 109a in accordance with a command signal from the actuator controller 21a, as a result of which the actuator 104a is operated to drive the elevator 103.

When the hydraulic apparatus 1 is operated as described above, the backup hydraulic pump 13 and the electric motor 14 generate heat, increasing the temperature of the air inside the wing structure portion 112, which is made from carbon fiber reinforced plastics and has high thermal insulation performance. Further, the temperature of the oil used in the hydraulic apparatus 1, or in other words, the oil that is pressured up by the backup hydraulic pump 13 and is supplied to the actuator 104a is also increased. Therefore, insufficient removal of the heat generated leads to a further increase in temperature of the backup hydraulic pump 13, the electric motor 14, the driver 15, and the oil used.

However, in the hydraulic apparatus 1, the wing structure portion 112 is provided with the panel body 11 made of a highly heat conductive metal (for example, an aluminum alloy). First, the heat generated in the backup hydraulic pump 13, the electric motor 14, and the oil being used is conducted to the air inside the wing structure portion 112 by heat conduction, heat transmission (convection), and heat radiation. Then, the heat conducted to the air inside the wing structure portion 112 is removed from the metal panel body 11 as indicated by the arrows H shown as arrows enclosed by chain double-dashed lines in FIG. 3, and is directly released into the low-temperature atmosphere outside the wing structure portion 112. Consequently, the hydraulic apparatus 1 is cooled via the air inside the wing structure portion 112, and the backup hydraulic pump 13, the electric motor 14, the driver 15, and the oil being used are cooled, suppressing an increase in the temperature of these components. As described above, the arrows H enclosed by the chain double-dashed lines are arrows schematically showing the direction of movement of the heat removed from the panel body 11, and the arrows Q shown by the alternate long and short dash lines are arrows schematically showing the direction of flow of the cooling air taken into the housing 17 by rotation of the cooling fan 16.

As described thus far, with the hydraulic apparatus 1, even if a loss or reduction in the function of the aircraft central hydraulic power sources (105, 106) occurs, the actuator 104*a* can be driven by the pressure oil being supplied from the backup hydraulic pump 13 of the pump unit 12 installed inside the tailplane 102. Since the pump unit 12 is installed inside the tailplane 102 whose weight has been reduced due to the principal part of the wing structure portion 112 being made from fiber reinforced plastics, a reduction in size and weight of the hydraulic apparatus 1 as well can be realized. Furthermore, with the hydraulic apparatus 1, the panel body 11 constituting part of the wing structure portion 112 is formed of a metallic material having high thermal conductivity. Accordingly, the heat generated from the backup hydraulic pump 13 and the electric motor 14 of the hydraulic apparatus 1 can be removed from the panel body 11 via the air inside the tailplane 102 to cool the hydraulic apparatus 1, and also can be directly released into the atmosphere outside the tailplane 102. Furthermore, this also makes it possible to utilize the cooling function of the oil used in the hydraulic apparatus 1, thus suppressing an increase in the oil temperature.

Therefore, according to this embodiment, it is possible to provide a hydraulic apparatus 1 for aircraft actuators that can drive the actuator 104*a* even in the case of a loss or reduction in the function of the aircraft central hydraulic power sources (105, 106), can realize a reduction in size and weight of the configuration of the apparatus, and can suppress an increase in the temperature of the apparatus and the oil used.

Furthermore, with the hydraulic apparatus 1, the panel body 11 for removing the heat inside the tailplane 102 and releasing it into the atmosphere outside the tailplane 102 can also be used to serve the function as an access hatch. Moreover, it is possible to simplify the production process since there is no need to separately form an aperture hole in the wing structure portion 112 for providing an access hatch. In other words, the panel body 11 can be provided with multiple functions, thus also simplifying the production process of the wing structure portion 112.

Furthermore, with the hydraulic apparatus 1, the driver 15 for driving the electric motor 14 is disposed downstream of the cooling fan 16 for cooling the electric motor 14, and therefore the driver 15 can be efficiently cooled by the cooling fan 16 inside the tailplane 102. Also, the heat removed from the driver 15 is removed from the panel body 11 via the air inside the tailplane 102, and is then released into the atmosphere outside the tailplane 102. Accordingly, the driver 15 can also be efficiently cooled. Although this embodiment has been described taking, as an example, a case where the driver 15 is disposed inside the housing 17, this need not be the case. The same effect can also be achieved when the driver 15 is disposed downstream of the cooling fan 16 outside the housing 17.

Although this embodiment has been described taking, as an example, a case where the panel body 11 is configured to serve the function of an access hatch, this need not be the case. It is also possible to adopt a configuration in which a metal panel body that does not have the function of an access hatch is provided. It is also possible to adopt a configuration in which a plurality of panel bodies are provided. It is also possible to adopt a configuration in which a metal panel body having the function of an access hatch and a metal panel body separately provided from an access hatch are provided.

Figure 4:
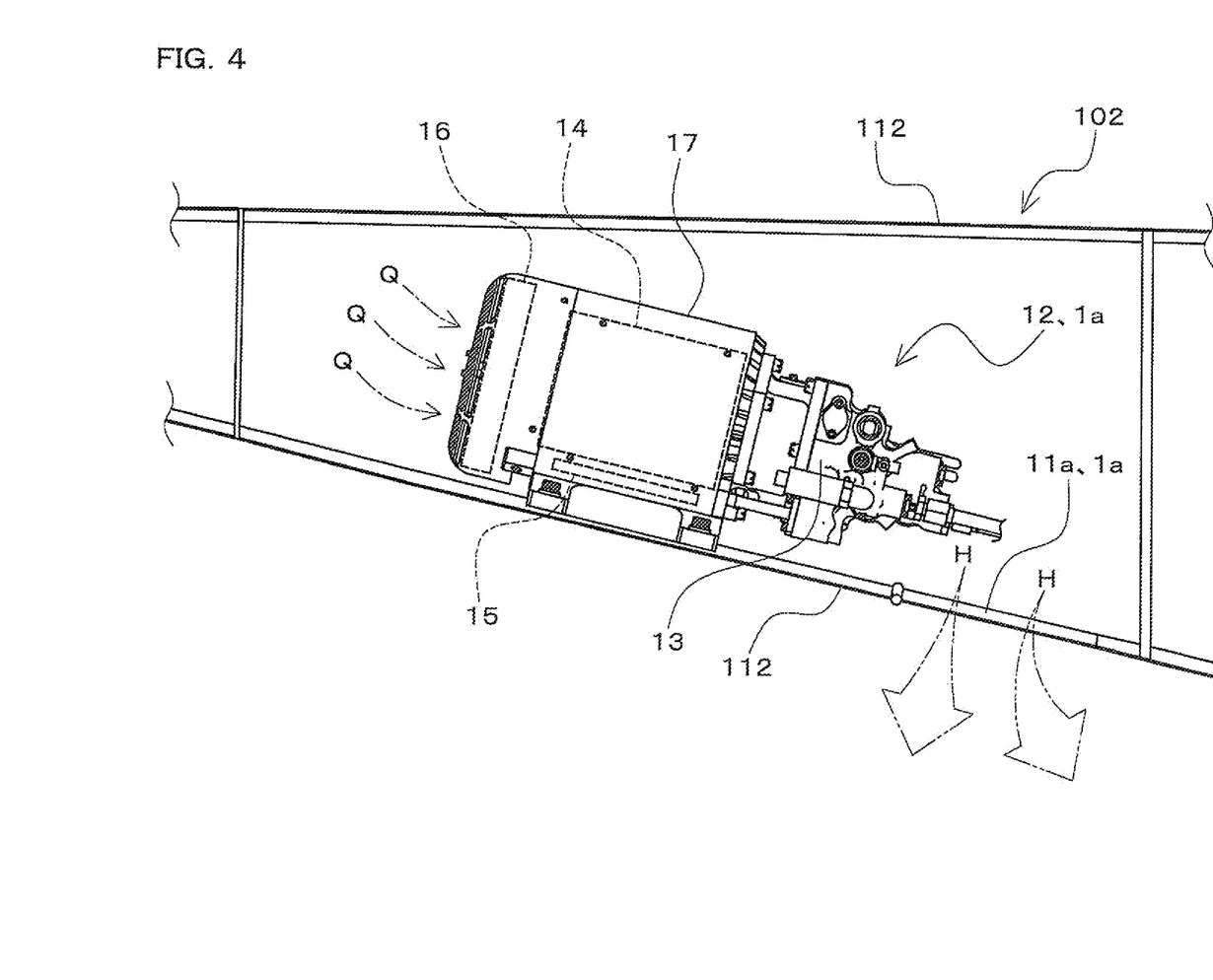
FIG. 4 is a diagram showing a hydraulic apparatus for aircraft actuators according to a modification of the first embodiment together with part of a wing.

FIG. 4 is a diagram showing a hydraulic apparatus 1*a* for aircraft actuators (hereinafter, simply referred to as a "hydraulic apparatus 1*a*") according to a modification of the first embodiment. FIG. 4 shows the hydraulic apparatus 1*a* together with part of a tailplane 102, in a state corresponding to FIG. 3. The hydraulic apparatus 1*a* includes a panel body 11*a* and a pump unit 12, as with the hydraulic apparatus 1. However, the hydraulic apparatus 1*a* is different from the hydraulic apparatus 1 in the position where a panel body 11*a* is disposed in a wing structure portion 112. In the description of the hydraulic apparatus 1*a* shown in FIG. 4, the differences from the hydraulic apparatus 1 will be described. The description of those elements configured in the same manner as in the hydraulic apparatus 1, the cooling air flow generated by the cooling fan 16 (the cooling air flow in the direction of the arrows Q), and the movement of the heat removed via the panel body 11*a* (the movement of the heat in the direction of the arrows H) is omitted by using the same reference numerals in the drawing.

The panel body 11*a* of the hydraulic apparatus 1*a* is formed as a planar member as with the panel body 11 of the hydraulic apparatus 1, and constitutes part of the wing structure portion 112. Also, the panel body 11*a* is provided as an access hatch that can be opened to inspect the interior of the tailplane 102, and is openably coupled to the wing structure portion 112 via a hinge portion. Additionally, the panel body 11*a* is disposed on the undersurface side of the tailplane 102. However, whereas the panel body 11 of the hydraulic apparatus 1 is disposed relative to the electric motor 14 on the side where the cooling fan 16 is disposed (on the side opposite to the backup hydraulic pump 13), the panel body 11*a* of the hydraulic apparatus 1*a* is disposed relative to the electric motor 14 on the side where the backup hydraulic pump 13 is disposed. In other words, the panel body 11*a* is disposed downstream of the cooling fan 16 (downstream of the cooling air flow generated by the cooling fan 16). Due to this arrangement of the panel body 11*a*, the heat of the hydraulic apparatus 1*a* that has been removed by the cooling air from the cooling fan 16 can be efficiently released into the outside atmosphere via the panel body 11*a*.

Second Embodiment

Next, a hydraulic apparatus 2 for aircraft actuators (hereinafter, also simply referred to as a "hydraulic apparatus 2") according to a second embodiment of the present invention will be described. As with the hydraulic apparatus 1 of the first embodiment, the hydraulic apparatus 2 is installed inside the tailplane 102 of the aircraft 100, and is configured to supply pressure oil to the hydraulically-operated actuator 104a for driving the elevator 103. Also, the hydraulic apparatus 2 is connected with the first aircraft central hydraulic power source 105, the reservoir circuit 110, and the control valve 109a with the same hydraulic circuit configuration as that of the hydraulic apparatus 1 of the first embodiment. Further, the hydraulic apparatus 2 is configured to operate in accordance with a command signal from the flight controller 22 as with the hydraulic apparatus 1.

Figure 5:
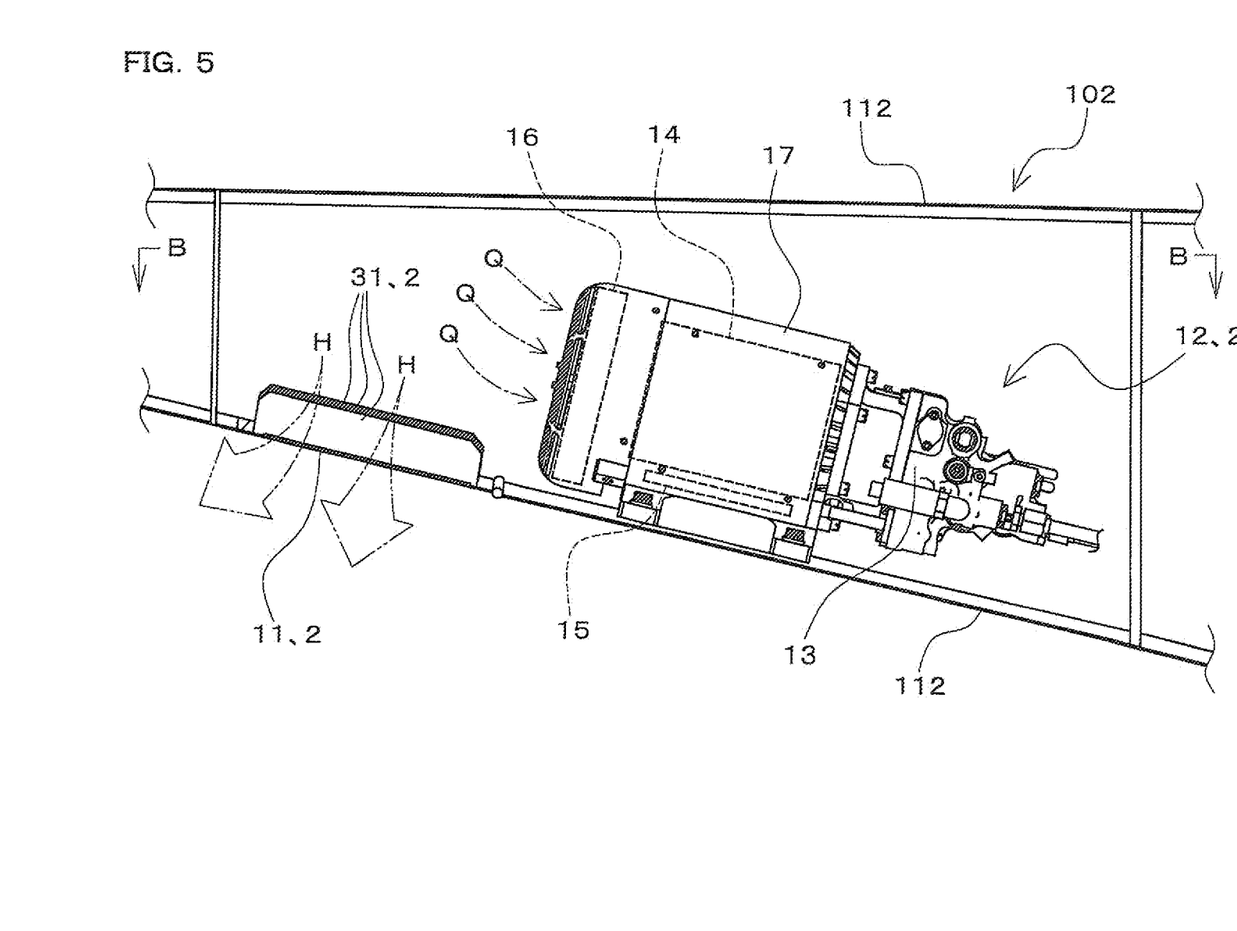
FIG. 5 is a diagram showing a hydraulic apparatus for aircraft actuators according to a second embodiment of the present invention together with part of a wing.
Figure 6:
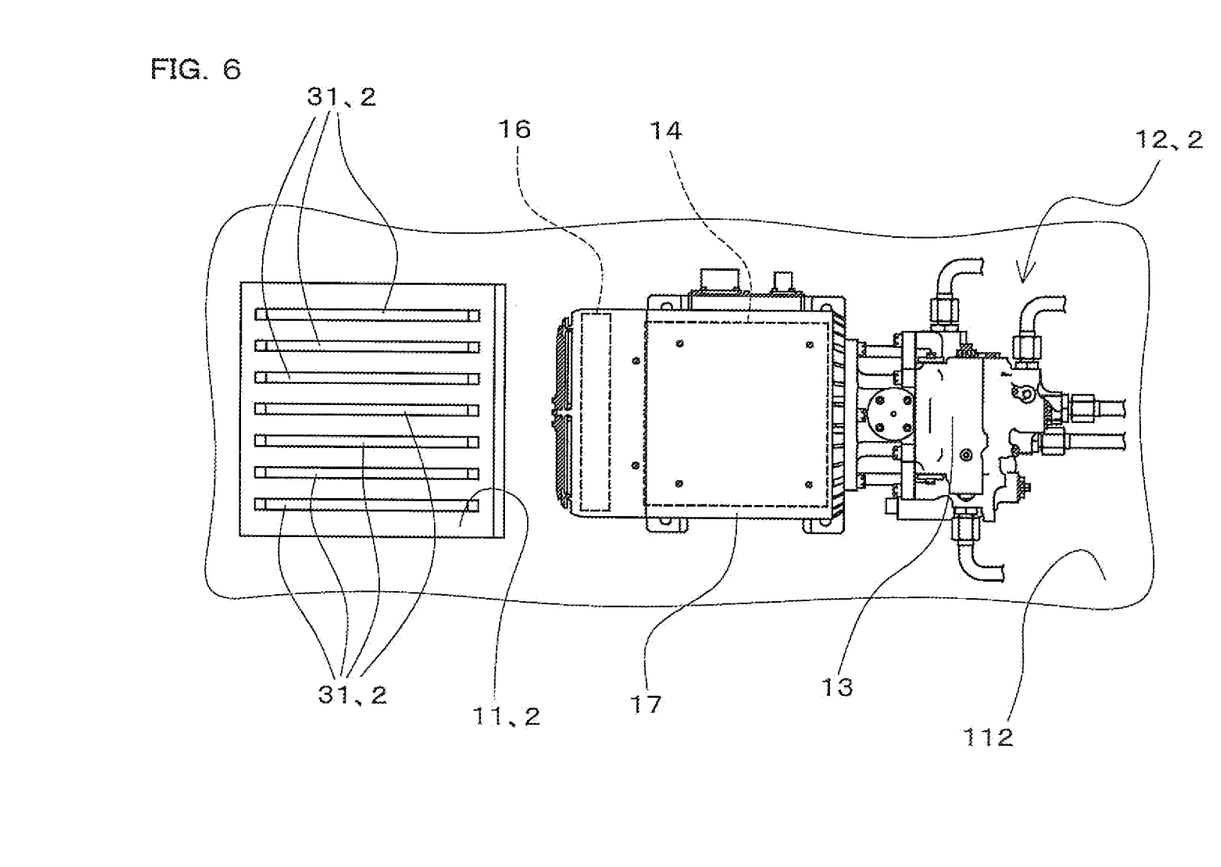
FIG. 6 is a diagram taken from the position of the arrows B-B in FIG. 5.

FIG. 5 is a diagram showing the hydraulic apparatus 2 together with part of the tailplane 102, in a state corresponding to FIG. 3 of the first embodiment. FIG. 6 is a diagram taken from the position of the arrows B-B in FIG. 5, showing the hydraulic apparatus 2 together with part of the wing structure portion 112. The hydraulic apparatus 2 includes the panel body 11 and the pump unit 12 as with the hydraulic apparatus 1 of the first embodiment. However, the hydraulic apparatus 2 is different from the hydraulic apparatus 1 of the first embodiment in that it further includes a plurality of fins 31. In the following description of the hydraulic apparatus 2, the differences in configuration from the first embodiment will be described. The description of those elements configured in the same manner as in the first embodiment is omitted by using the same reference numerals in the drawings, or by referring to the same reference numerals.

The plurality of fins 31 are implemented on the panel body 11, and are formed of a metallic material such as an aluminum alloy. Also, the plurality of fins 31 are each formed in the shape of a protruding plate, are fixed to the panel body 11 in a state in which they are disposed parallel to each other, and are installed so as to be able to conduct heat to and from the panel body 11. In this embodiment, the plurality of fins 31 are provided as a plurality of first fins 31 that are each implemented so as to protrude toward the inside of the tailplane 102.

With the hydraulic apparatus 2 described above, first, the heat generated in the backup hydraulic pump 13, the electric motor 14, and the oil being used is conducted to the air inside the wing structure portion 112 by heat conduction, heat transmission (convection), and heat radiation. Then, the heat conducted to the air inside the wing structure portion 112 is removed from the plurality of metal fins 31 and the metal panel body 11 as indicated by the arrows H shown as arrows enclosed by chain double-dashed lines in FIG. 5, and is directly released into the low-temperature atmosphere outside the wing structure portion 112. Consequently, the hydraulic apparatus 2 is cooled via the air inside the wing structure portion 112, and the backup hydraulic pump 13, the electric motor 14, the driver 15, and the oil being used are cooled, suppressing an increase in the temperature of these components. As described above, the arrows H enclosed by the chain double-dashed lines in FIG. 5 are arrows schematically showing the direction of movement of the heat removed from the panel body 11, and the arrows Q shown by the alternate long and short dash lines are arrows schematically showing the direction of flow of the cooling air taken into the housing 17 by rotation of the cooling fan 16.

According to this embodiment described thus far, it is possible to achieve the same effect as the first embodiment. That is, according to this embodiment, it is possible to provide a hydraulic apparatus 2 for aircraft actuators that can drive the actuator 104a even in the case of a loss or reduction in the function of the aircraft central hydraulic power sources (105, 106), can realize a reduction in size and weight of the configuration of the apparatus, and can suppress an increase in the temperature of the apparatus and the oil used.

With the hydraulic apparatus 2, the plurality of plate-like fins (first fins) 31 that are formed of a metallic material and are provided so as to protrude toward the inside of the tailplane 102 are implemented so as to be able to conduct heat to and from the panel body 11. Accordingly, the heat generated in the hydraulic apparatus 2 can be even more efficiently removed via the air inside the tailplane 102, via the metal fins 31 for which a large surface area is ensured.

Although this embodiment has been described taking, as an example, a case where the plurality of fins 31 are formed in the shape of protruding plates, the shape of the fins is not limited to this example, and various modification can be made. For example, it is possible to adopt a configuration in which fins that are formed in the shape of projections are provided so as to ensure a large surface area.

Although this embodiment has been described taking, as an example, a case where the panel body 11 and the first fins 31 of the hydraulic apparatus 2 are disposed relative to the electric motor 14 on the side where the cooling fan 16 is disposed (on the side opposite to the backup hydraulic pump 13), this need not be the case. For example, the panel body 11 and the first fins 31 of the hydraulic apparatus 2 may be disposed relative to the electric motor 14 on the side where the backup hydraulic pump 13 is disposed. In other words, the panel body 11 and the first fins 31 may be disposed downstream of the cooling fan 16 (downstream of the cooling air flow generated by the cooling fan 16). Due to this arrangement of the panel body 11 and the first fins 31, the heat of the hydraulic apparatus 2 that has been removed by the cooling air from the cooling fan 16 can be efficiently released into the outside atmosphere via the first fins 31 and the panel body 11.

Third Embodiment

Next, a hydraulic apparatus 3 for aircraft actuators (hereinafter, also simply referred to as a "hydraulic apparatus 3") according to a third embodiment of the present invention will be described. As with the hydraulic apparatus 1 of the first embodiment, the hydraulic apparatus 3 is installed inside the tailplane 102 of the aircraft 100, and is configured to supply pressure oil to the hydraulically-operated actuator 104a for driving the elevator 103. Also, the hydraulic apparatus 3 is connected with the first aircraft central hydraulic power source 105, the reservoir circuit 110, and the control valve 109a with the same hydraulic circuit configuration as that of the hydraulic apparatus 1 of the first embodiment. Further, the hydraulic apparatus 3 is configured to operate in accordance with a command signal from the flight controller 22 as with the hydraulic apparatus 1.

Figure 7:
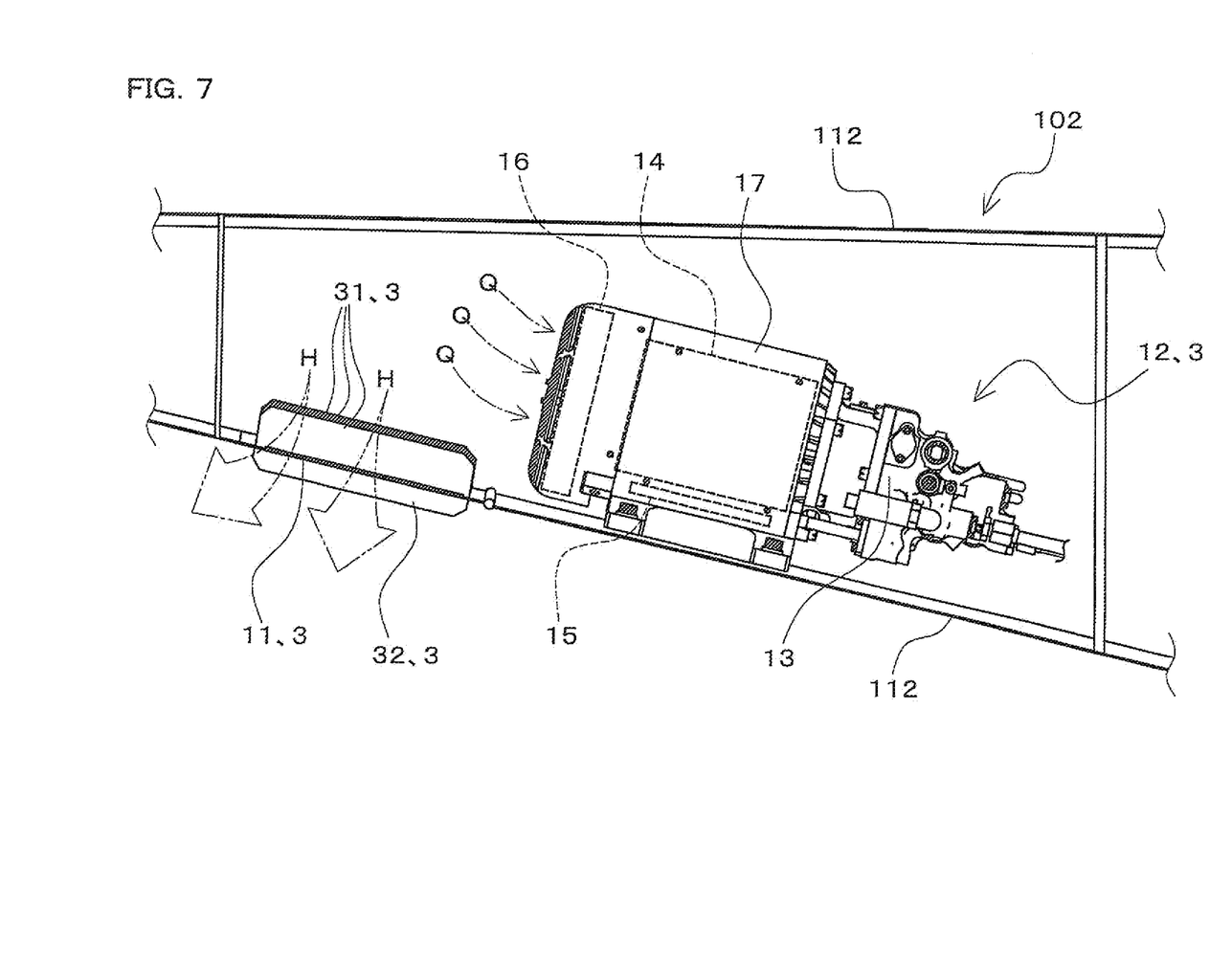
FIG. 7 is a diagram showing a hydraulic apparatus for aircraft actuators according to a third embodiment of the present invention together with part of a wing.

FIG. 7 is a diagram showing the hydraulic apparatus 3 together with part of the tailplane 102, in a state corresponding to FIG. 3 of the first embodiment. The hydraulic apparatus 3 includes the panel body 11 and the pump unit 12 as with the hydraulic apparatus 1 of the first embodiment. However, the hydraulic apparatus 3 is different from the hydraulic apparatus 1 of the first embodiment in that it further includes a plurality of fins (31, 32). In the following description of the hydraulic apparatus 3, the differences in configuration from the first embodiment will be described. The description of those elements configured in the same manner as in the first embodiment is omitted by using the same reference numerals in the drawings, or by referring to the same reference numerals.

As the plurality of fins (31, 32), a plurality of first fins 31 configured in the same manner as the plurality of fins 31 of the second embodiment and a plurality of second fins 32 are provided. As with the second embodiment, the plurality of first fins 31 are implemented on the panel body 11, and are formed of a metallic material such as an aluminum alloy. Also, the plurality of first fins 31 are each formed in the shape of a protruding plate, are fixed to the panel body 11 in a state in which they are disposed parallel to each other, and are implemented so as to be able to conduct heat to and from the panel body 11. The plurality of first fins 31 are each implemented so as to protrude toward the inside of the tailplane 102.

The plurality of second fins 32 are implemented on the panel body 11, and are formed of a metallic material such as an aluminum alloy. Also, the plurality of second fins 32 are each formed in the shape of a protruding plate, are fixed to the panel body 11 in a state in which they are disposed parallel to each other, and are implemented so as to be able to conduct heat to and from the panel body 11. The plurality of second fins 32 are each implemented so as to protrude toward the outside of the tailplane 102. In other words, the plurality of second fins 32 are implemented so as to protrude toward the side opposite to the side toward which the plurality of first fins 31 protrude, relative to the panel body 11.

Furthermore, each of the plurality of second fins 32 is disposed parallel to, for example, a cross section along the chord direction of the tailplane 102 (i.e., a cross section perpendicular to the width direction of the tailplane 102 (the longitudinal direction of the tailplane 102)). Also, the plurality of second fins 32 are provided as fairings that regulate the flow of air on the surface of the tailplane 102.

With the hydraulic apparatus 3 described above, first, the heat generated in the backup hydraulic pump 13, the electric motor 14, and the oil being used is conducted to the air inside the wing structure portion 112 by heat conduction, heat transmission (convection), and heat radiation. Then, the heat conducted to the air inside the wing structure portion 112 is removed from the plurality of metal first fins 31 and the metal panel body 11 as indicated by the arrows H shown as arrows enclosed by chain double-dashed lines in FIG. 7, and is directly released into the low-temperature atmosphere outside the wing structure portion 112 from the plurality of metal second fins 32 and the panel body 11. Consequently, the hydraulic apparatus 3 is cooled via the air inside the wing structure portion 112, and the backup hydraulic pump 13, the electric motor 14, the driver 15, and the oil being used are cooled, suppressing an increase in the temperature of these components. As described above, the arrows H enclosed by the chain double-dashed lines in FIG. 7 are arrows schematically showing the direction of movement of the heat removed from the first fins 31 and the panel body 11, and the arrows Q shown by the alternate long and short dash lines are arrows schematically showing the direction of flow of the cooling air taken into the housing 17 by rotation of the cooling fan 16.

According to this embodiment described thus far, it is possible to achieve the same effect as the first embodiment. That is, according to this embodiment, it is possible to provide a hydraulic apparatus 3 for aircraft actuators that can drive the actuator 104a even in the case of a loss or reduction in the function of the aircraft central hydraulic power sources (105, 106), can realize a reduction in size and weight of the configuration of the apparatus, and can suppress an increase in the temperature of the apparatus and the oil used.

With the hydraulic apparatus 3, the plurality of plate-like first fins 31 that are formed of a metallic material and are provided so as to protrude toward the inside of the tailplane 102 are implemented so as to be able to conduct heat to and from the panel body 11. Accordingly, the heat generated in the hydraulic apparatus 3 can be even more efficiently removed via the air inside the tailplane 102, via the metal first fins 31 for which a large surface area is ensured.

Moreover, with the hydraulic apparatus 3, the plurality of plate-like second fins 32 that are formed of a metallic material and are provided so as to protrude toward the outside of the tailplane 102 are implemented so as to be able to conduct heat to and from the panel body 11. Accordingly, the heat that has been generated in the hydraulic apparatus 3 and has been removed via the air inside the tailplane 102 or via heat conduction can be even more efficiently released into the atmosphere outside the tailplane 102, via the metal second fins 32 for which a large surface area is ensured.

Furthermore, with the hydraulic apparatus 3, the plurality of second fins 32 for releasing heat into the atmosphere outside the tailplane 102 can also be used to serve the function as fairings. Moreover, it is possible to realize the weight reduction as compared to the case where fairings are separately provided. Accordingly, the fins 32 can be provided with multiple functions, thus also making it possible to realize the weight reduction efficiently.

Although this embodiment has been described taking, as an example, a case where the plurality of fins (31, 32) are formed in the shape of protruding plates, the shape of fins is not limited to this example, and various modification can be made. For example, it is possible to adopt a configuration in which fins that are formed in the shape of projections are provided so as to ensure a large surface area. Further, although this embodiment has been described taking, as an example, a case where the plurality of second fins 32 are configured to serve the function of fairings, this need not be the case. It is possible to adopt a configuration in which a plurality of second fins that do not have the function of fairings are provided.

Although this embodiment has been described taking, as an example, a case where the panel body 11, the first fins 31, and the second fins 32 of the hydraulic apparatus 3 are disposed relative to the electric motor 14 on the side where the cooling fan 16 is disposed (on the side opposite to the backup hydraulic pump 13), this need not be the case. For example, the panel body 11, the first fins 31, and the second fins 32 of the hydraulic apparatus 3 may be disposed relative to the electric motor 14 on the side where the backup hydraulic pump 13 is disposed. In other words, the panel body 11, the first fins 31, and the seconds fin 32 may be disposed downstream of the cooling fan 16 (downstream of the cooling air flow generated by the cooling fan 16). Due to this arrangement of the panel body 11, the first fins 31, and the second fins 32, the heat of the hydraulic apparatus 3 that has been removed by the cooling air from the cooling fan 16 can be efficiently released into the outside atmosphere via the first fins 31, the panel body 11, and the second fins 32.

Fourth Embodiment

Next, a hydraulic apparatus 4 for aircraft actuators (hereinafter, also simply referred to as a "hydraulic apparatus 4") according to a fourth embodiment of the present invention will be described. As with the hydraulic apparatus 1 of the first embodiment, the hydraulic apparatus 4 is installed inside the tailplane 102 of the aircraft 100, and is configured to supply pressure oil to the hydraulically-operated actuator 104a for driving the elevator 103. Also, the hydraulic apparatus 4 is connected with the first aircraft central hydraulic power source 105, the reservoir circuit 110, and the control valve 109a with the same hydraulic circuit configuration as that of the hydraulic apparatus 1 of the first embodiment. Further, the hydraulic apparatus 4 is configured to operate in accordance with a command signal from the flight controller 22 as with the hydraulic apparatus 1.

Figure 8:
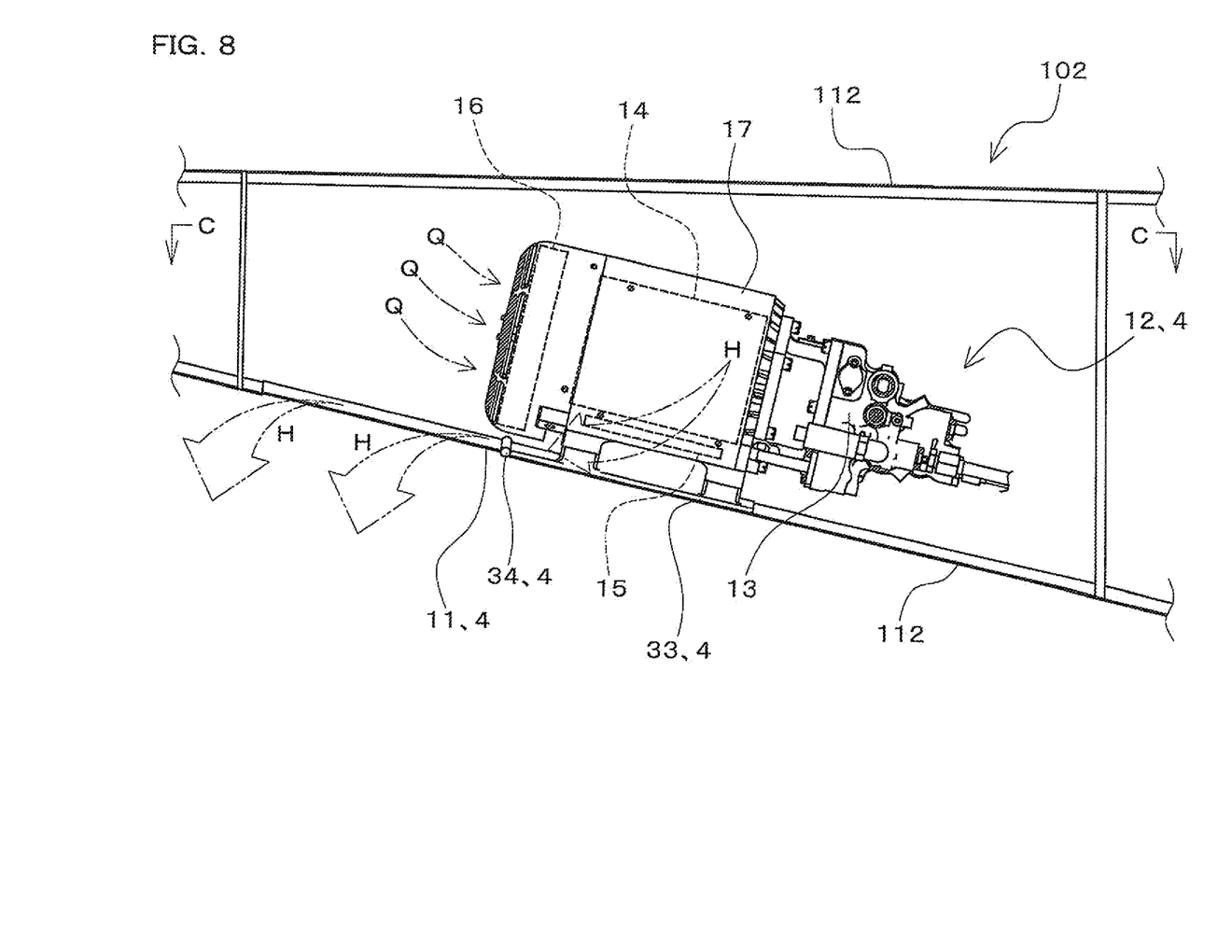
FIG. 8 is a diagram showing a hydraulic apparatus for aircraft actuators according to a fourth embodiment of the present invention together with part of a wing.
Figure 9:
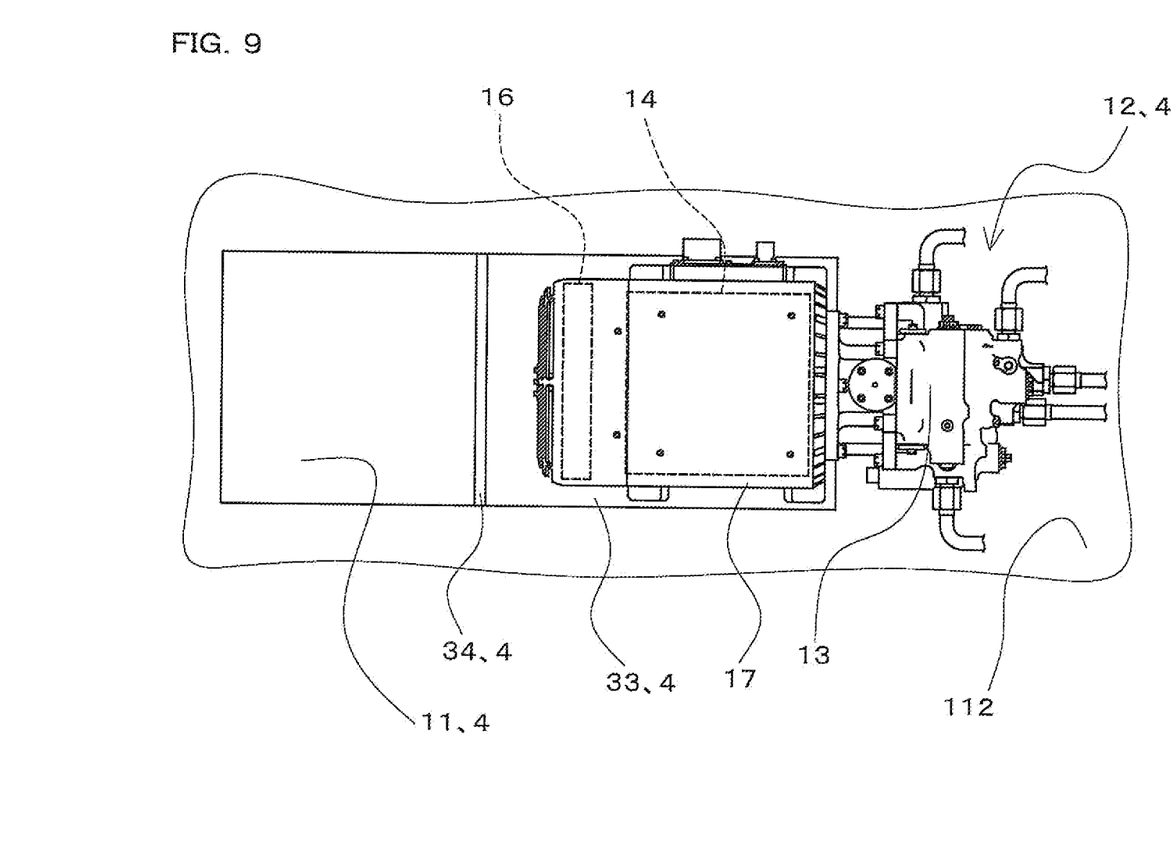
FIG. 9 is a diagram taken from the position of the arrows C-C in FIG. 8.

FIG. 8 is a diagram showing the hydraulic apparatus 4 together with part of the tailplane 102, in a state corresponding to FIG. 3 of the first embodiment. FIG. 9 is a diagram taken from the position of the arrows C-C in FIG. 8, showing the hydraulic apparatus 4 together with part of the wing structure portion 112. The hydraulic apparatus 4 includes the panel body 11 and the pump unit 12 as with the hydraulic apparatus 1 of the first embodiment. However, the hydraulic apparatus 4 is different from the hydraulic apparatus 1 of the first embodiment in that the pump unit 12 further includes a pump base 33. In the following description of the hydraulic apparatus 4, the differences in configuration from the first embodiment will be described. The description of those elements configured in the same manner as in the first embodiment is omitted by using the same reference numerals in the drawings, or by referring to the same reference numerals.

As shown in FIGS. 8 and 9, the pump base 33 included in the pump unit 12 is provided as a planar base portion on which the backup hydraulic pump 13 is installed. The pump base 33 is fixed to the members disposed on the undersurface side of the wing structure portion 112, on the inner side of the wing structure portion 112. The pump base 33 is formed of a metallic material such as steel or an aluminum alloy. Then, the panel body 11 is coupled to the pump base 33 via a hinge portion 34 made of metal (for example, steel or an aluminum alloy). Consequently, the pump base 33 is implemented so as to be able to conduct heat to and from the panel body 11, and the pump unit 12 is integrally joined to the panel body 11 via the hinge portion 34.

With the hydraulic apparatus 4 described above, first, the heat generated in the backup hydraulic pump 13, the electric motor 14, and the oil being used is conducted to the air inside the wing structure portion 112 by heat conduction, heat transmission (convection), and heat radiation, and is also conducted to the metal pump base 33 by heat conduction. As with the first embodiment, the heat conducted to the air inside the wing structure portion 112 is removed from the panel body 11 and is released into the low-temperature atmosphere outside the wing structure portion 112. Further, with the hydraulic apparatus 4, the heat conducted to the metal pump base 33 by heat conduction is removed from the metal hinge portion 34 and the metal panel body 11 by heat conduction as indicated by the arrows H shown as arrows enclosed by chain double-dashed lines in FIG. 8, and is directly released into the low-temperature atmosphere outside the wing structure portion 112. Consequently, the hydraulic apparatus 4 is cooled via the air inside the wing structure portion 112, and the backup hydraulic pump 13, the electric motor 14, the driver 15, and the oil being used are cooled, suppressing an increase in the temperature of these components. As described above, the arrows H enclosed by the chain double-dashed lines in FIG. 8 are arrows schematically showing the direction of movement of the heat removed from the pump base 33, the hinge portion 34 and the panel body 11, and the arrows Q shown by the alternate long and short dash lines are arrows schematically showing the direction of flow of the cooling air taken into the housing 17 by rotation of the cooling fan 16.

According to this embodiment described thus far, it is possible to achieve the same effect as the first embodiment. That is, according to this embodiment, it is possible to provide a hydraulic apparatus 4 for aircraft actuators that can drive the actuator 104*a* even in the case of a loss or reduction in the function of the aircraft central hydraulic power sources (105, 106), can realize a reduction in size and weight of the configuration of the apparatus, and can suppress an increase in the temperature of the apparatus and the oil used.

With the hydraulic apparatus 4, the pump base 33 is implemented so as to be able to conduct heat to and from the panel body 11, and therefore the heat generated in the hydraulic apparatus 4 can be efficiently conducted to the panel body 11 via the pump base 33. Moreover, since the pump unit 12 is integrally joined to the panel body 11, heat can be conducted from the pump unit 12 directly to the panel body 11. Accordingly, the heat generated in the hydraulic apparatus 4 can be removed to the panel body 11 and released into the atmosphere outside the tailplane 102. Note that, with the hydraulic apparatus 4, the panel body 11 is coupled to the metal pump base 33 via the metal hinge portion 34. Accordingly, it is possible to easily realize a configuration that couples the panel body 11 to the pump base 33 such that heat can be conducted therebetween.

Although this embodiment has been described taking, as an example, a case where the pump base 33 is coupled to the panel body 11 via the hinge portion 34, this need not be the case. For example, it is possible to adopt a configuration in which the pump base 33 is implemented so as to be able to conduct heat to and from the panel body 11 via a metal member (a plate-like member, a flexible cable-like member, or the like). It is also possible to adopt a configuration in which no pump base is provided, and the pump unit is integrally joined to a metal panel body that is provided separately from an access hatch. Alternatively, a metal panel body having the function of an access hatch and a metal panel body that is provided separately from an access hatch and to which the pump unit is integrally joined may be provided.

Although this embodiment has been described taking, as an example, a case where the panel body 11 of the hydraulic apparatus 4 is disposed relative to the electric motor 14 on the side where the cooling fan 16 is disposed (on the side opposite to the backup hydraulic pump 13) and is coupled to the pump base 33, this need not be the case. For example, the panel body 11 of the hydraulic apparatus 4 may be disposed relative to the electric motor 14 on the side where the backup hydraulic pump 13 is disposed and may be coupled to the pump base 33. In other words, the panel body 11 may be disposed downstream of the cooling fan 16 (downstream of the cooling air flow generated by the cooling fan 16) and may be coupled to the pump base 33. Due to this arrangement of the panel body 11, the heat of the hydraulic apparatus 4 that has been removed by the cooling air from the cooling fan 16 can be efficiently released into the outside atmosphere via the panel body 11.

Although embodiments of the present invention have been described thus far, the present invention is not limited to the above-described first to fourth embodiments, and various modifications may be made within the scope recited in the claims. For example, it is possible to implement a hydraulic apparatus for aircraft actuators that supplies pressure oil to an actuator for driving a control surface other than elevator, such as an aileron. Further, various modifications can be made for the configuration of the hydraulic circuit that connects the hydraulic apparatus for aircraft actuators with the aircraft central hydraulic power sources. In addition, the metallic material constituting the panel body is not limited to an aluminum alloy, and various metallic materials may be used.

The present invention can be widely used as a hydraulic apparatus for aircraft actuators that supplies pressure oil to a hydraulically-operated actuator for driving a control surface of an aircraft. The present invention is not limited to the above-described embodiments, and all modifications, applications and equivalents thereof that fall within the claims, for which modifications and applications would become apparent by reading and understanding the present specification, are intended to be embraced therein.

What is claimed is:

1. A hydraulic apparatus for aircraft actuators that supplies pressure oil to a hydraulically-operated actuator for driving a control surface of an aircraft, the apparatus comprising:
   a pump unit installed inside a wing of the aircraft; and
   a panel body formed of a metallic material, the panel body being connected to a wing structure portion formed from fiber reinforced plastics forming a surface structure of the wing, and the panel body constitutes a part of the surface structure of the wing,
   wherein the pump unit includes a backup hydraulic pump configured to supply pressure oil to the actuator when a loss or reduction occurs in a function of an aircraft central hydraulic power source and an electric motor configured to drive the backup hydraulic pump, and
   wherein the pump unit further includes a planar pump base serving as a base portion on which the backup hydraulic pump is installed, and
   the pump base is formed of a metallic material and is implemented so as to be able to conduct heat to and from the panel body.

2. The hydraulic apparatus for aircraft actuators according to claim 1,
   further comprising a plurality of fins disposed on the panel body and formed of a metallic material in the shape of a protrusion or a protruding plate,
   wherein the plurality of fins are adapted to conduct heat to and from the panel body.

3. The hydraulic apparatus for aircraft actuators according to claim 2,
   wherein a plurality of first fins that are implemented so as to protrude toward the inside of the wing are provided as the plurality of fins.

4. The hydraulic apparatus for aircraft actuators according to claim 2,
   wherein a plurality of second fins that are implemented so as to protrude toward the outside of the wing are provided as the plurality of fins.

5. The hydraulic apparatus for aircraft actuators according to claim 4,
   wherein the plurality of fins are provided as fairings that regulate a flow of air on the surface of the wing.

6. The hydraulic apparatus for aircraft actuators according to claim 1,
   wherein the pump unit is integrally joined to the panel body.

7. The hydraulic apparatus for aircraft actuators according to claim 1,
   wherein the panel body is provided as an openable access hatch for maintenance of interior of the wing.

8. The hydraulic apparatus for aircraft actuators according to claim 1,
   wherein the panel body is coupled to the pump base via a metal hinge portion.

9. The hydraulic apparatus for aircraft actuators according to claim 1,
   wherein the pump unit includes a cooling fan configured to cool the electric motor, and a driver disposed downstream of the cooling fan, wherein the driver is configured to drive the electric motor.

* * * * *